United States Patent [19]

Verjux

[11] 4,189,045
[45] Feb. 19, 1980

[54] DEVICE FOR TRANSFERRING ROD-LIKE OBJECTS

[75] Inventor: Jean Verjux, Pavillons sous Bois, France

[73] Assignee: Arenco-Decoufle, Paris, France

[21] Appl. No.: 845,421

[22] Filed: Oct. 25, 1977

[30] Foreign Application Priority Data

Nov. 23, 1976 [FR] France ............................... 76 35179

[51] Int. Cl.² ............................................. B65G 47/26
[52] U.S. Cl. ..................................... 198/457; 198/598
[58] Field of Search .............. 198/457, 461, 456, 689, 198/598

[56] References Cited

U.S. PATENT DOCUMENTS 2,010,486   8/1935   Herrmann .......................... 198/457
2,176,485   10/1939  Bronander ...................... 198/689 X

*Primary Examiner*—Joseph E. Valenza
*Assistant Examiner*—Douglas D. Watts

[57] ABSTRACT

This device for longitudinally-moving rod-like cylindrical objects in a transversal direction, notably for transferring cigarettes issuing in end-to-end relationship and in-line from a cigarette making machine to a conveyor drum formed with spaced peripheral grooves each adapted to receive a cigarette comprises a pair of cams adapted to off set the leading cigarette and to accelerate same as required for causing the cigarette to penetrate accurately into the corresponding groove of the drum while avoiding any detrimental contact between the cigarette and the walls of the groove. The velocity of rotation of the cams expressed in number of r.p.m. is equal to the number of cigarette delivered by the cigarette making machine.

3 Claims, 4 Drawing Figures

DEVICE FOR TRANSFERRING ROD-LIKE OBJECTS

BACKGROUND OF THE INVENTION

1. Field of the Invention

This invention relates in general to devices for transferring longitudinaly-moving rod-like cylindrical objects in a transverse direction, notably from a linear conveyor to a drum-like conveyor, as currently used in the manufacture of cigarettes.

2. Description of the Prior Art

Hitherto known modern cigarette-making machines are designed for manufacturing an endless rectilinear roll of tobacco wrapped in a sheet of paper, this roll being cut into sections of equal length which are subsequently caused to travel longitudinally by forming a line of cigarettes joined in end-to-end relationship on a conveyor.

The cigarettes are then introduced into a transfer device generally referred to as a transfer conveyor, which carries along the cigarettes separately in a direction perpendicular to their longitudinal axis while slowing down and eventually stopping their longitudinal movement.

In most cases the conveyor consists of a grooved drum rotatably driven at a constant speed about an axis parallel to the axis along which the roll of cigarettes is fed.

Each groove formed in the drum is of substantially semi-cylindrical configuration with a diameter or width of 9 to 10 mm, which flares out considerably at its cigarette-receiving or input end to enable the cigarettes to penetrate into the drum along more than half the cigarette length before engaging one wall of the groove which imparts a sudden shock to the cigarette in a direction across its axis.

The pitch between the successive grooves of the drum increases with the width of the inlet outflared portion, and the peripheral speed of the drum is proportional to the groove pitch. Therefore, the greater the pitch, the stronger the transverse shock applied to the cigarettes.

Before the cigarettes penetrate into the drum, their linear speed is increased considerably with respect to that of the roll, in order to reduce the time necessary for such introduction so that the width of the outflared portion of the groove can be increased to twice the diameter of the semi-cylindrical portion thereof.

However, in modern high-speed cigarette making machines operating at a rate of the order of 4,000 cigarettes per minute, the cigarettes are exposed to a treatment rather detrimental to their quality; in fact, the high-speed shock applied by the side wall of the groove to the cigarette causes the tobacco contained in the cigarette ends to escape partially therefrom and also a distortion of the cigarette proper; besides, the sudden braking of the cigarettes, of which the velocity of translation was increased by the preceding acceleration, is attended by the emptying of the front or leading end of the cigarette.

To avoid this inconvenience, a known proposition consisted in imparting a transverse movement to the cigarettes preliminary to their introduction into the drum, in order to approach as much as possible the peripheral speed of the drum. This action is attended by a twofold improvement: on the one hand, it is no more necessary to apply a substantial longitudinal acceleration to the cigarettes for speeding up their introduction into the drum grooves, and it is only necessary to increase their linear speed by 3 to 5% for developing a gap of 2 to 3 mm between the cigarettes in order to separate them and therefore avoid any frictional contact therebetween during the transverse movement of the leading cigarette; on the other hand, the pitch of the drum grooves may be selected to correspond substantially to the cigarette diameter, thus decreasing appreciably the peripheral speed of the drum.

Under these conditions, the transverse and longitudinal forces applied to the cigarettes are reduced considerably, this eliminating to a substantial degree the damages and distortions of the processed cigarettes.

SUMMARY OF THE INVENTION

To obtain this advantageous result the device according to the present invention, interposed between the line of end-to-end joined cigarettes flowing from the cigarette making machine and the conveyor, the cigarettes being delivered horizontally in a direction parallel to the axis of rotation of the conveyor and tangent to the drum thereof, comprises an endless perforated tape having one span driven in a vertical plane at a speed slightly greater than the cigarette delivery speed, along one side thereof, and the cigarettes are urged against the outer surface of said tape span by a vacuum prevailing behind the other surface of said one span, between the cigarette feeding device and the conveyor. There is further provided a pair of similar rotary cams having their axes disposed horizontally and normally to the direction in which the incoming cigarettes are fed, said cams being driven at a peripheral speed greater than the linear speed of said one span of the endless perforated tape and of the cigarettes urged thereagainst, said cams being so disposed and mounted that they engage the upper surface of each cigarette only simultaneously in order to push this cigarette transversely and downwardly, parallel to themselves and tangentially to the drum, and that they discontinue their engagement with the cigarette concerned only simultaneously when the front or leading end of the cigarette engages a groove of said conveyor drum.

Preferably, the distance between centers of these two cams is such that they engage a cigarette only during the time in which the center of gravity of the cigarette lies between their centers, in order better to preserve the horizontality of the cigarette during its transverse transfer and to facilitate the penetration of the cigarette into a drum groove.

Also preferably, the cams are rotatably driven at a number of r.p.m. equal to the number of cigarettes manufactured per minute by the machine and in order to obtain the desired result each cam consists of a circular eccentric disc portion or sector covering only one quarter of its circumference. The throw or eccentricity is such that when the contact between the cams and the cigarette being transferred ceases, these cams have already imparted to the cigarette a gradually increasing transverse velocity up to a value substantially equal to the peripheral velocity of the drum grooves.

The attached drawing illustrates diagrammatically by way of example a typical form of embodiment of the invention.

DESCRIPTION OF THE PREFERRED EMBODIMENT

Figure 1:
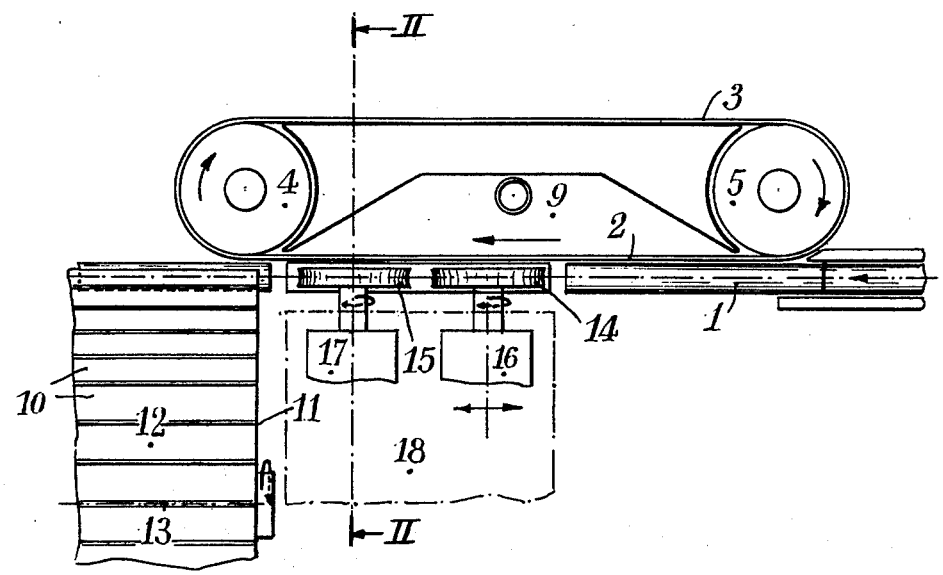
FIG. 1 is a plane view from above.
Figure 2:
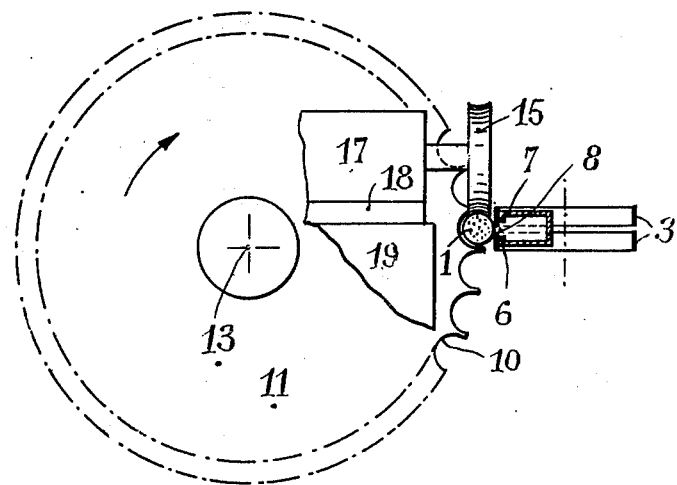
FIG. 2 is a section taken along the line II—II of FIG. 1.

The cigarettes 1 travelling in end to end relationship along a continuous line at a velocity V are driven at a slightly greater velocity $V_1$ by the span 2 of an endless tape 3 passing around a pair of pulleys 4 and 5 of which one is driven by motor means (not shown); this tape may consist of a pair of parallel elements 6 and 7 separated by a gap 8 for example of the order of 2 mm. This span 2 moves past a chamber 9 in which a vacuum is created in order to urge the cigarettes laterally against said span 2 of the endless tape which is intended for driving the cigarettes into successive grooves 10 formed in the drum 11 of conveyor 12 driven in turn for rotation about its axis 13 at a peripheral velocity such that the grooves 10 of drum 11 are caused to move past the line of cigarettes in a manner enabling each empty groove to register with a separate incoming cigarettes.

In order to impart to each cigarette, before it penetrates into a groove 10 of drum 11 of conveyor 12, a lateral velocity equal to the velocity at which the grooves move past the fixed assembly and in a direction tangent to the drum, a pair of identical rotary cams 14 and 15 are mounted above the line of cigarettes 1 in a plane coincident with the axis of the cigarettes 1 and also with the axis of a groove 10 located in a horizontal plane of drum 11.

The cams 14 and 15 consist of rotary discs formed with a peripheral groove driven for continuous rotation about their axes $O_1$ and $O_2$ at the velocity of N r.p.m., N being the number of cigarettes produced and fed per minute by the machine; each disc 14, 15 comprises a sector $A_1B_1$, $A_2B_2$ centered at $C_1$ and $C_2$ offset by a distance "e" from the aforementioned centers $O_1$ and $O_2$, the angular extent of these sectors being limited to about 90°.

Figure 3:
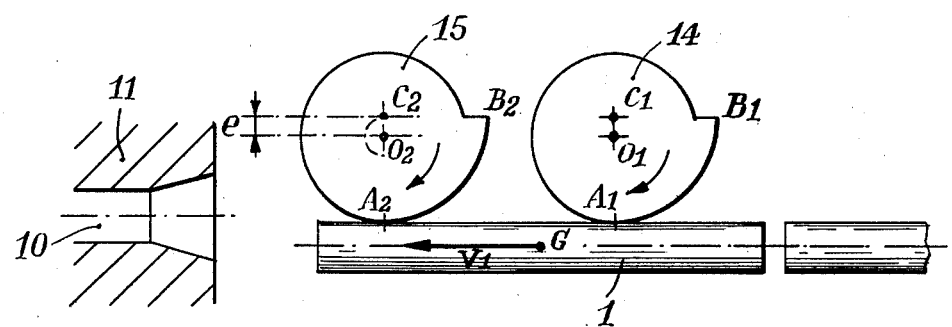
FIG. 3 is a diagrammatic front elevational view showing on a larger scale the relative position of the cigarettes and component elements of the device with the cams in their initial positions.
Figure 4:
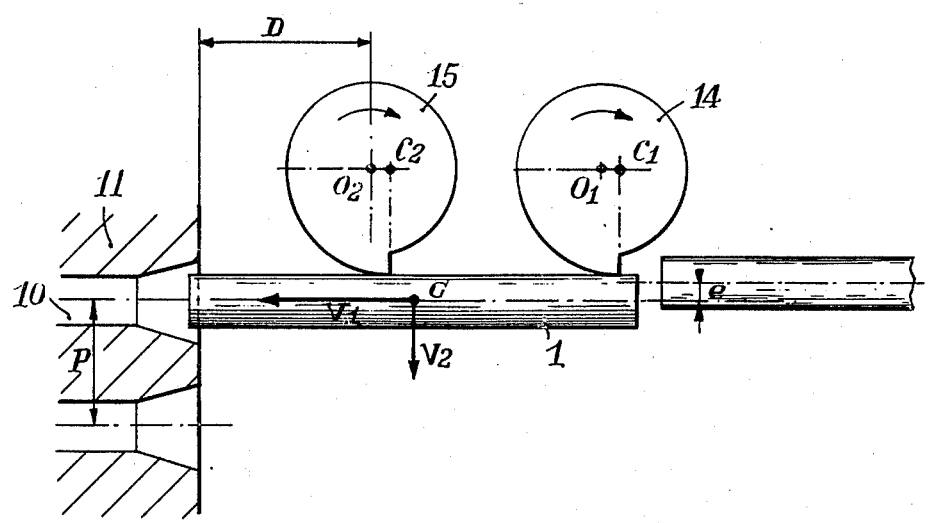
FIG. 4 is a view similar to FIG. 4 showing the conditions obtaining at the end of the cam operation.

The origins $A_1$, $A_2$ of the eccentric sectors $A_1$, $B_1$ and $A_2$, $B_2$ engage the cigarette 1 when the speed increment from V to $V_1$, imparted to the cigarette by the endless tape 3, has detached this cigarette from the next cigarette in the line, when its center of gravity G lies between points $A_1$ and $A_2$, as shown in FIG. 3, and their ends $B_1$, $B_2$ move away from the cigarette when said center of gravity G still lies between points $B_1$ and $B_2$, as shown in FIG. 4, the cigarette having travelled longitudinally during this movement through a distance corresponding to about one-fourth of its length and transversely through a distance "e" corresponding to the eccentricity or throw of the centers $C_1$ and $C_2$ of the eccentric sectors of cams 14 and 15 with respect to their axes of rotation $O_1$ and $O_2$. Then the cigarette 1 begins to penetrate into a groove 10 of the conveyor drum 11, the relative or peripheral spacing or pitch of these grooves being denoted P in FIG. 4. To obtain a correct penetration of the cigarette into the relevant groove, the transverse velocity $V_2$ of the cigarette must be equal to the peripheral velocity of the drum, or otherwise expressed:

$$2\pi Ne = NP$$

giving the eccentricity:

$$e = P/2\pi$$

To obtain a correct penetration of the cigarette into the drum groove 10, the distance D between the axis $O_2$ of the downstream eccentric disc 15 and the input face of drum 11 must be adjustable as a function of the length of the cigarette being processed. For this purpose, the cases 16 and 17 of discs 14 and 15 respectively are secured to a plate 19 movable independently of and parallel to the axis of the cigarette line on a support or bracket 19.

Throughout its travel, the cigarette remains in contact with the span 2 of endless tape 3 and therefore its longitudinal velocity $V_1$ is not reduced.

Of course, the specific form of embodiment shown and described herein should not be construed as limiting the scope of the invention since it is given simply by way of illustration. Consequently, many modifications and changes may be brought to this form of embodiment, notably as a function of the kind of articles or objects to be processed. In fact, although this device has been designed chiefly for transferring cigarettes travelling in-line and in end to end relationship, it would not constitute a departure from the basic principles of this invention to apply these principles to the transfer of other rod-like cylindrical objects and articles of any other type and nature.

What is claimed as new is:

1. A device for individually transferring cigarettes being fed longitudinally in abutting end-to-end relationship into successive grooves of a rotary drum conveyer comprising in combination:
   said grooved rotary drum conveyer;
   a perforated endless tape positioned axially to one side of said drum in the path of travel of the cigarettes, having one run in a vertical plane and travelling at a speed slightly higher than and in the direction of travel of the cigarettes;
   vacuum means on the inner face of said vertical run for urging individual cigarettes against said tape;
   a pair of rotary cams also axially spaced from the same side of said drum in a common vertical plane which includes the longitudinal axis of the cigarettes being fed and positioned above the path of travel of cigarettes for engagement, when rotated, with individual cigarettes to impart a velocity transverse to their longitudinal axis and substantially equal to the peripheral velocity of said drum, the peripheral velocity of the cam being slightly higher than the longitudinal velocity of said tape and the horizontal spacing between said cams, being such that they contact the cigarette only during the time the center of gravity of the cigarette lies between the cams, whereby the cigarettes are individually projected outwardly of said tape and cams and into the grooves of said drum.

2. A device as claimed in claim 1 wherein each of said cams comprises a circular eccentric covering only one-fourth of the circumference thereof and in which said cams are rotated at a number of revolutions per unit time which is equal to the number of cigarettes transferred in the same unit of time.

3. A device as claimed in claim 1 wherein the eccentricity of said cam is equal to $P/2\pi$ in which P is the pitch of the regularly spaced grooves formed in said conveyor drum.

* * * * *